Patented June 19, 1945

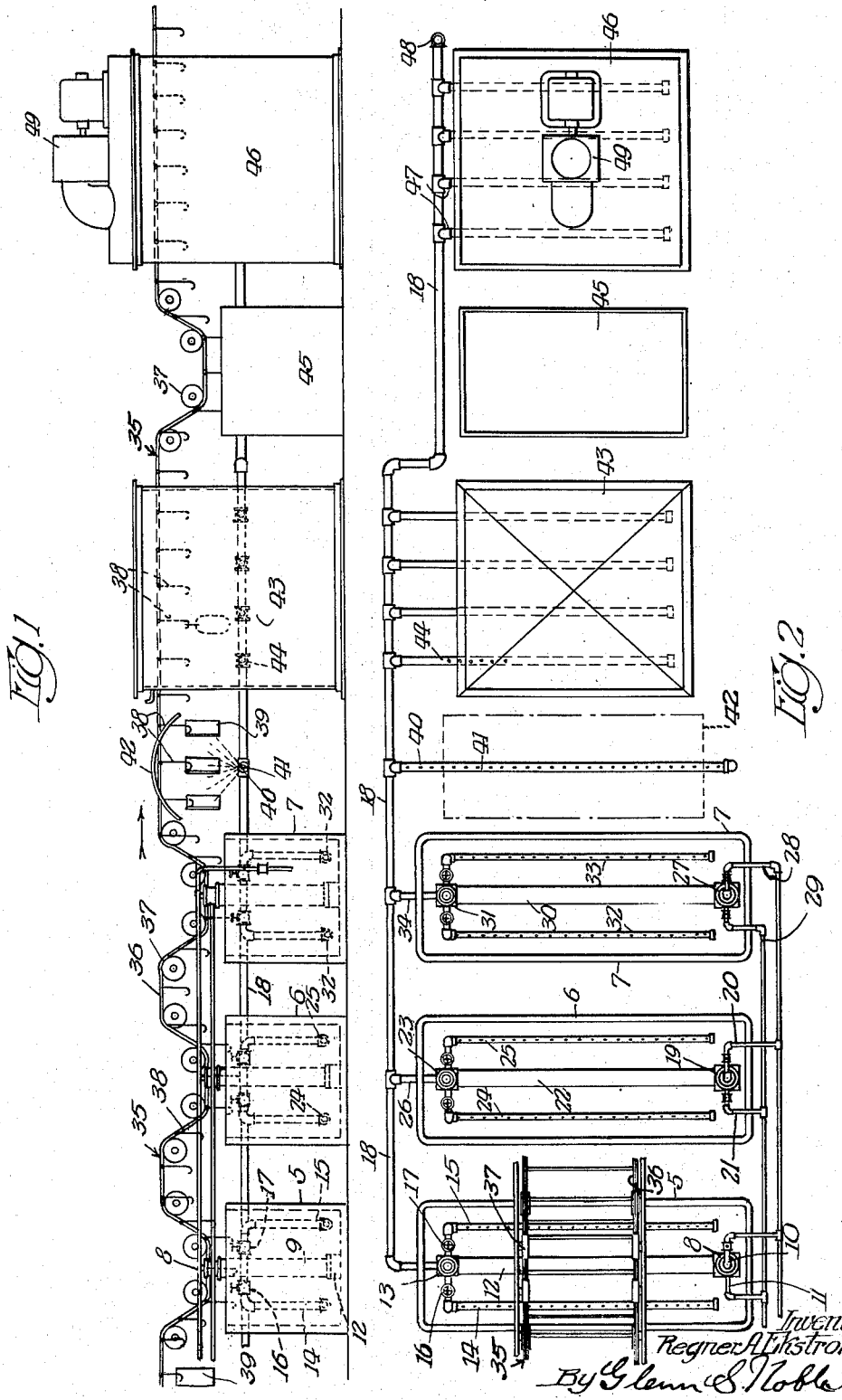

2,378,758

UNITED STATES PATENT OFFICE 2,378,758

APPARATUS FOR USE IN TREATING AND COATING ARTICLES

Regner A. Ekstrom, Jr., Markham, Ill., assignor to Elematic Corporation, Chicago, Ill., a corporation of Illinois Application March 2, 1943, Serial No. 477,773

5 Claims. (Cl. 91—13)

This invention relates to an apparatus for heating liquid in tanks, preferably by means of a submerged burner or burners, and utilizing the exhaust heat for other purposes such as removing liquid from articles which have been treated in the tanks, heating a drying oven and also a paint drying oven.

The objects of this invention are to improve certain apparatus adapted for use in cleaning, drying and painting or coating various articles; to provide one or more metal pickling or cleaning tanks with burners for heating the liquid in the tanks, and means for utilizing the exhaust heat or excess heat from the burners or other operations; to provide a system in which articles to be coated or painted are first cleaned or pickled in suitable tanks, then conveyed to drying apparatus, then submerged in paint or coating material, and finally dried in a paint drying oven, the heat for the various operations being furnished by the heaters for heating the pickling or cleaning liquids; to provide an improved apparatus or system for heating liquid in tanks and using the exhaust or excess heat for other purposes; and to provide such other improvements and advantages as will appear more fully from the following description taken in connection with the accompanying drawing in which, Fig. 1 is a diagrammatic view of my improved apparatus or system for carrying out essential operations used in the improved method; and Fig. 2 is a plan view of the apparatus shown in Fig. 1, the parts also being shown diagrammatically or omitted for convenience in illustration.

As shown in this drawing, the tanks shown at 5, 6 and 7 are for holding any of the well known liquids used for pickling or cleaning metal. These tanks are heated by heating apparatus such as shown in my copending application for Liquid heating apparatus, Serial No. 424,120, filed December 23, 1941. The tank 5 is provided with a burner 8 having a vertical combustion chamber 9 which is supplied with gas or fuel through a supply pipe 10 and with compressed air through pipe 11. The burner is ignited by any suitable means preferably by electric ignition such as utilized for such purposes and shown in my copending application. The combustion chamber 9 is connected with a heat transfer duct 12 that extends along the bottom or lower portion of the tank and is connected with a riser pipe 13 that extends upwardly above the top of the liquid and is closed at its upper end. The duct 12 may be provided with a plurality of outlet holes (not shown) for exhausting the gases of combustion directly into the liquid, and I prefer to provide one or more exhaust pipes 14 and 15 which are connected with the riser above the level of the liquid and extend downwardly and along the bottom of the tank. These pipes are provided with outlet holes for discharging the exhaust gases into the liquid. They are also preferably provided with valves 16 and 17 for controlling the flow of gases through the same. The riser 13 is connected with an exhaust pipe 18 which is common to all of the burners as will presently be explained.

It will be seen that when the gas and air are furnished to the burner 8 in proper proportions for combustion and are burned therein, the gases of combustion will pass down through the combustion chamber and then through the duct 12 and up through the riser 13. Some of such gases may be diverted to the agitating and distributing pipes 14 and 15 while any excess gas will pass off through the exhaust pipe 18.

The tank 6 is provided with a burner 19 which is supplied with gas through pipe 20 and air through pipe 21. The burner connects with a duct 22 which leads to a riser 23 as above described in conection with the first tank, and agitating and distributing pipes 24 and 25 are connected with the riser 23 for furnishing hot gases to the liquid in this tank. The riser 23 is connected by means of a pipe 26 with the exhaust pipe 18.

The tank 7 is also provided with a burner 27 which is supplied with gas through pipe 28 and air through pipe 29. The burner is connected with a submerged duct 30 which leads to a riser 31 as above described. Heating and agitating pipes 32 and 33 are connected with the riser 31 and supply heated gas to the liquid in the tank 7. The riser 31 is connected by means of pipe 34 with the common exhaust pipe 18. It will be understood that the burners may be provided with any controlling or regulating apparatus commonly used for such purposes, and the various pipes may be provided with controlling valves for regulating the passage of gas or fluid therethrough.

A complete embodiment of the invention preferably includes conveyor means for conveying the devices or articles to be treated to submit them to the various operations desired. In the apparatus shown, the conveyor, designated generally by the numeral 35, comprises a conveyor belt or chain 36 which coacts with a plurality of roller guides 37 and is provided with hooks or hangers 38 for carrying the articles or parts 39 that are to be treated. The rollers or guides are arranged to cause the conveyor to move downwardly and upwardly at various points for lowering and raising the articles as, for instance, into and out of different baths, cleaning fluids, paint, or the like.

A stripper pipe 40 is connected with the pipe 18 adjacent to the tank 7 and has a plurality of holes 41 for directing the hot gases against the articles 39 as they pass over the pipe. This serves the blow or strip the moisture drops from the articles preparatory to the next operation. A shield or deflector plate 42 is preferably mounted above the pipe 41 and helps to retain the hot gases while the articles are passing therethrough. The conveyor next moves through a drying oven 43 which is supplied with gas from the pipe 18 through a plurality of perforated pipes 44, the arrangement being such that the articles will be thoroughly dried in passing through such oven. The conveyor next passes over a paint tank 45 which is supplied with liquid paint, and the guide rollers 37 are arranged so that the articles 39 are carried into, through and out of the liquid paint. The conveyor then passes through a paint drying oven 46 which is supplied with heat from the pipe 18 by means of a plurality of perforated pipes 47. The end of the pipe 18 may be capped or provided with a valve 48. The paint drying tank may be equipped with an exhaust or air circulating apparatus of the usual kind as shown at 49.

In the operation of the apparatus or system, the articles 39 to be treated are placed on the hooks 38 and first passed into, through and out of the several tanks 5, 6 and 7 where they may be subject to the action of pickling, cleaning and rinsing liquids such as are commonly used for these purposes. These fluids are heated to the desired temperatures by the several burners and agitated by means of gas from the perforated pipes submerged therein. In order to provide such heat for these tanks, it is usually necessary to burn an excess amount of gas and the gases of consumption and excess heat will pass through the pipe 18 to the various instrumentalities as described where it will be utilized with little or no loss. After the articles pass through the last tank, they are carried over the stripper pipe 41 where the free moisture is blown off and from thence go through the drying oven 43 where they are sufficiently dried for the next operation. This consists in lowering them into the paint in tank 45 and after they have been coated, they pass through the point drying oven 46 and are then ready to be removed from the conveyor, it being understood that the conveyor belt passes around over suitable guides to complete the circuit.

While I have shown and described a preferred form of my apparatus, it will be apparent that the same may be modified to adapt it for treating different articles or for subjecting them to different kinds of treatment, and therefore I do not wish to be limited to the particular apparatus described except as set forth in the following claims in which

I claim:

1. In an apparatus of the character set forth, the combination of a plurality of tanks for holding liquids, a burner of the submerged type for each tank, a common exhaust pipe connected with all of the burners, a perforated pipe for removing moisture from articles to be dried, connected with said exhaust pipe, a drying oven, means for supplying heat from the exhaust pipe for heating the drying oven, a paint drying oven, and means for supplying heat from the exhaust pipe for heating said paint drying oven.

2. In an apparatus for cleaning and coating articles, the combination of a plurality of tanks for holding different liquids, a burner for each tank, means for supplying air and gas to each burner, a conduit leading from each burner along the bottoms of the respective tanks, a common exhaust pipe, means connecting the several conduits with the exhaust pipe, means for directing some of the gases of combustion into the liquid in the respective tanks to heat and agitate the same, drying means for drying the articles to be treated, and means for supplying heat from the exhaust pipe to said drying means.

3. In combination, a plurality of tanks for holding liquids for treating metallic articles, a burner of the submerged combustion type for heating each of said tanks, a common exhaust pipe for said burners, jets for stripping moisture from the articles to be treated, a drying oven, a paint tank, a paint drying oven, means for supplying heated gases from the exhaust pipe to the jets, the drying oven and the paint drying oven, and a conveyor for converging articles to be treated arranged to immerse said articles in the liquid in any or all of said tanks and then to carry the articles over the jets, then through the drying oven, then into the paint and finally through the paint drying oven, for the purposes described.

4. In a system of the character set forth, the combination of a plurality of tanks for holding liquids for treating articles, a separate burner of the submerged combustion type for heating the liquid in each of said tanks, a common exhaust pipe for all of said burners, means for drying the articles after they have been treated in said tanks, a tank for holding a coating liquid, a drying oven for drying said coating liquid, means for supplying heated gases from the common exhaust pipe to the drying means and the coating drying oven and a conveyor for conveying articles to be treated, mounted and arranged to immerse said articles in the liquid in any or all of said tanks and then to carry the articles through the drying means, then into the coating material and finally through the coating drying oven for the purposes described.

5. In an apparatus of the character set forth, the combination of a tank for holding liquid for treating articles, a burner of the submerged combustion type for heating the liquid in said tank, said burner being adapted to supply an excess amount of heat over the amount necessary for heating liquid, means for drying the articles after they have been immersed in the liquid, a tank for coating material, a drying oven for drying said coating material, means for carrying the gases of combustion from said submerged burner to the drying means and also to the coating drying oven whereby the excess heat will be utilized in such drying operations and a conveyor for conveying the articles to be treated arranged to immerse the same in the liquid in said tank, and then to carry the articles through the drying means and dipping them in the coating material and finally passing them through the coating drying oven for the purposes described.

REGNER A. EKSTROM, JR.